US011432557B2

(12) United States Patent
Barshak

(10) Patent No.: US 11,432,557 B2
(45) Date of Patent: Sep. 6, 2022

(54) MICROWAVEABLE FROZEN LOBSTER TAIL PRODUCTS

(71) Applicant: Alison W Barshak, Brookehaven, GA (US)

(72) Inventor: Alison W Barshak, Brookehaven, GA (US)

(73) Assignee: Absolutely Lobster, Atlanta, GA (US)

( * ) Notice: Subject to any disclaimer, the term of this patent is extended or adjusted under 35 U.S.C. 154(b) by 0 days.

(21) Appl. No.: 17/061,560

(22) Filed: Oct. 1, 2020

(65) Prior Publication Data

US 2021/0169093 A1 Jun. 10, 2021

Related U.S. Application Data

(62) Division of application No. 14/080,227, filed on Nov. 14, 2013, now Pat. No. 10,806,154.

(60) Provisional application No. 61/721,082, filed on Nov. 14, 2012.

(51) Int. Cl.
*A22C 29/02* (2006.01)
*A23B 4/16* (2006.01)
*A23L 17/40* (2016.01)

(52) U.S. Cl.
CPC ............ *A22C 29/025* (2013.01); *A22C 29/02* (2013.01); *A23B 4/16* (2013.01); *A23L 17/40* (2016.08)

(58) Field of Classification Search
None
See application file for complete search history.

(56) References Cited

U.S. PATENT DOCUMENTS

| 4,898,743 A | 2/1990 | Ross |
| 5,863,576 A | 1/1999 | Guarino |
| 5,863,578 A | 1/1999 | Guarino |
| 2009/0277898 A1 | 11/2009 | Cisek |

FOREIGN PATENT DOCUMENTS

| CA | 2396139 | 1/2004 |
| EP | 2210497 | 7/2010 |
| FR | 2958633 | 10/2011 |

OTHER PUBLICATIONS

Can't Believe We Ate. Mar. 14, 2011. https://cantbelieveweate.wordpress.com/2011/03/14.*
Scubaboard. 2007. Retrieved from internet URL: <https://www.scubaboard.com/community/threads/help-fast-how-to-freeze-lobster-tails.195895/page-2>.*

(Continued)

*Primary Examiner* — Erik Kashnikow
*Assistant Examiner* — Ashley Axtell
(74) *Attorney, Agent, or Firm* — Graham Casanova Alig; Alig Patent Law

(57) ABSTRACT

In one embodiment, a minimally-processed microwaveable lobster product including a lobster tail, a fat-containing composition, and a microwaveable package. The lobster tail has a shell containing lobster meat. The shell has a longitudinal axis with at least one cut formed generally parallel to the longitudinal axis. The fat-containing composition is disposed in a region above the lobster tail. The microwaveable package has first and second resilient layers. The first resilient layer is disposed under the lobster tail and contacts the lobster tail. The second resilient layer is disposed above the lobster tail and contacts the lobster tail and the fat-containing composition.

18 Claims, 6 Drawing Sheets

(56) References Cited

OTHER PUBLICATIONS

Wayne, Gisslen. Professional Cooking. Jan. 11, 2010. Wiley. 7th Edition. p. 77-78. Retrieved from URL: <http://dl.booktolearn.com/ebooks2/cooking/9780470197523_professional_cooking_7th_edition_a6c8.pdf>.*

SousVide Supreme Demi Instructions. 2010. Retrieved from URL: <http://fantes.net/manuals/sous-vide-demi_manual-recipes.pdf>.*

Fraser, Doug. Lobsters are coming out of their shells. Mar. 5, 2008. Cape Cod Times. Retrieved from URL: <https://www.capecodtimes.com/article/20080305/LIFE/803050301>.*

New York Culinary Experience. Cooking Issues. Oct. 6, 2009. Retrieved from URL: <http://cookingissues.com/2009/10/06/new-york-culinary-experience-technique-a-thon-pressure-cooking-eggs-super-rich-sorbet-nstuff/>.*

Lobster Preparation. Jul. 18, 2001. Retrieved from URL: <https://web.archive.org/web/20010718043814/http://diver.net/seahunt/d_rlprep.htm>.*

Yahoo Answers. 2010. URL: https://ca.answers.yahoo.com/question/index?qid=20070803170444AAocOVI&guccounter=1&guce_referrer=aHR0cHM6Ly93d3cuYmluZy5jb20v&guce_referrer_sig=AQAAAL_b1Azj1w-BebKF_mDgQIreYDJ61SdwbT1-W44ADyuUIRgfVPRcotNT5V0VNxCptdtqkhqyAYP7fKS9DgPY8KXsDnngcSJeOBWiXKqHgZYKjvUZ2PkB8pu2V9dyHZrHsIHJFf_O.*

Spearboard. 2008. Retrieved from URL: < http://www.spearboard.com/showthread.php?t=70886>.*

Dan Hernandez on Gamesaver Lobster. Sport Fishing. Mar. 22, 2012. Retrieved from URL: <https://www.youtube.com/watch?v=JzmGGEdhv5g>.*

How to Freeze Raw Lobster. Jun. 27, 2011. Retrieved from URL: <https://web.archive.org/web/20121113215850/https://www.livestrong.com/article/479752-how-to-freeze-raw-lobster/>.*

Food Saver Frequently Asked Questions. Jan. 16, 2007. Retrieved from URL: <http://web.archive.org/web/20070116234712/http://www.foodsaver.com/FAQs.aspx?Cat=Cust#23>.*

The Maine Debate: Hard or Soft Shell Lobster. Our Acadia Blog. May 10, 2009. http://ouracadia.com/blog/2009/05/10/the-maine-debate-hard-or-soft-- shell-lobster.

The Fabulous Food Fanatic: Sous Vide Cooking. Jan. 30, 2011. http://fabulousfoodfanatic.com/tag/sous-vide-cooking.

FR 2958633 Espacenet Translation.

FR 2958633 Derwent Abstract.

Lobster Tails and Clarified Butter. therecipebox.com May 11, 2009. Retrieved from Internet Archive URL <https://web.archive.org/web/20090511003743/http://www.therecipebox.co- m/microwave/seafood/mo_sea0017.htm>.

Glazing. Research and Development Fact Sheet. Seafish.org. May 8, 2008. Retrieved from Internet URL: <http://www.seafish.org/media/publications/fs2-05_08-glazing.pdf>.

Plastic Definition. Google Search. Retrieved from Internet URL: <https://www.google.com/search?q=plastic&oq=plastic&aqs=chrome..69i57j-69i5913j69i61j0.4319j0j7&sourceid=chrome&es_sm=122&ie=UTF-8#q=plastic+definition>.

Beer Steamed Lobster Tails. Dec. 31, 2010. Retrieved from: <http://batterlicker.com/2010/12/beer-steamed-lobster-tails/>.

LobsterHelp. Mar. 21, 2009. Retrieved from :<http://www.lobsterhelp.com/steaming-lobster-tails.html>.

Crticial Microwave Cooking Technique Tips. May 12, 2009. Retrieved from: <http://www.panasonic.com/consumer/microwave/recipes/includes/pdf/char-ts/CRITICAL-MICROWAVE-COOKING-TECHNIQUE-TIPS.pdf>.

Maine Lobster Tail. SousVide Supreme . Jan. 1, 2011. Retrieved from URL: <https://blog.sousvidesupreme.com/2011/01/maine-lobster-tail/>.

* cited by examiner

MICROWAVEABLE FROZEN LOBSTER TAIL PRODUCTS

CROSS-REFERENCE TO RELATED APPLICATIONS

This application claims priority to U.S. Provisional Patent Application Ser. No. 61/726,082, filed Nov. 14, 2012, the disclosure of which is incorporated herein by reference in its entirety.

BACKGROUND

Technical Field

The present invention relates, generally, to shellfish, and more particularly, to the processing and cooking of lobster.

Description of the Related Art

Consumers enjoy the flavor of fresh-cooked lobster. However, live lobster is an expensive, extremely-perishable, and labor-intensive luxury item that has not been suited to home cooking and can be difficult to cook for the average home chef.

Some manufacturers fully cook lobsters (e.g., by steaming or sous-vide cooking) and then freeze or refrigerate and package the cooked lobsters, to provide a long shelf life and eliminate the requirement for consumers to cook the lobster at home. However, these fully-cooked lobsters are typically brined, often resulting in an overly salty or rubbery product. Or, due to sous-vide cooking methods, these lobsters are cooked at such a low temperature that the texture does not resemble that of a typical fresh-cooked lobster.

Alternatively, to improve the home cooking experience for consumers, some manufacturers sell whole lobster that has been blanched, i.e., partially cooked, prior to freezing and packaging. However, the blanching process cooks the juices out of the lobster and reduces its flavor, in like manner to boiling chicken.

Consumers can buy raw frozen lobster tails that the consumer thaws before cooking, but the thawing process causes loss of moisture and juices. Additionally, manufacturers use additives to keep these lobster tails plump, and these additives cause chemical reactions that tend to make sauces that these lobster tails are cooked in watery.

Other manufacturers sell lobster with meat that has been fully or partially loosened from the shell using high-pressure air or water, prior to freezing and packaging, so that the meat easily separates from the shell after cooking. However, the high pressure used to extract the lobster meat tends to degrade the texture and quality of the meat.

Consumers expect that cooking lobster in a microwave would result in tough, rubbery, and inedible lobster, which is the result normally obtained when attempting to cook raw lobster in a microwave. There has previously been no way for a consumer to cook raw lobster at home, in a single step, in a way that results in a tender, juicy, delicious, ready-to-eat product, with its own sauce, in a matter of minutes.

SUMMARY

Embodiments of the invention provide solutions to the foregoing problems and additional benefits, by providing a way for an ordinary consumer with a microwave to enjoy lobster tail at home and a processing and cooking method for fresh-frozen lobster that is quick, neat, easy, labor-reduced, waste-reduced, self-contained, and results in a perfectly-cooked, ready-to-eat lobster product that tastes the same as if cooked from live in a conventional manner.

In one embodiment, the present invention provides a minimally-processed microwaveable lobster product including a lobster tail, a fat-containing composition, and a microwaveable package. The lobster tail has a shell containing lobster meat. The shell has a longitudinal axis with at least one cut formed generally parallel to the longitudinal axis. The fat-containing composition is disposed in a region above the lobster tail. The microwaveable package has first and second resilient layers. The first resilient layer is disposed under the lobster tail and contacts the lobster tail. The second resilient layer is disposed above the lobster tail and contacts the lobster tail and the fat-containing composition.

In another embodiment, the present invention provides a method for manufacturing a microwaveable lobster product. The method includes: (a) forming a cut generally parallel to the longitudinal axis of the shell of a lobster tail containing lobster meat; (b) disposing a fat-containing composition in a region above the lobster tail; and (c) disposing the lobster tail and fat-containing composition together in a microwaveable package comprising first and second resilient layers, such that the first resilient layer is disposed under the lobster tail and contacts the lobster tail, and the second resilient layer is disposed above the lobster tail and contacts the lobster tail and the fat-containing composition.

DETAILED DESCRIPTION

Figure 1:
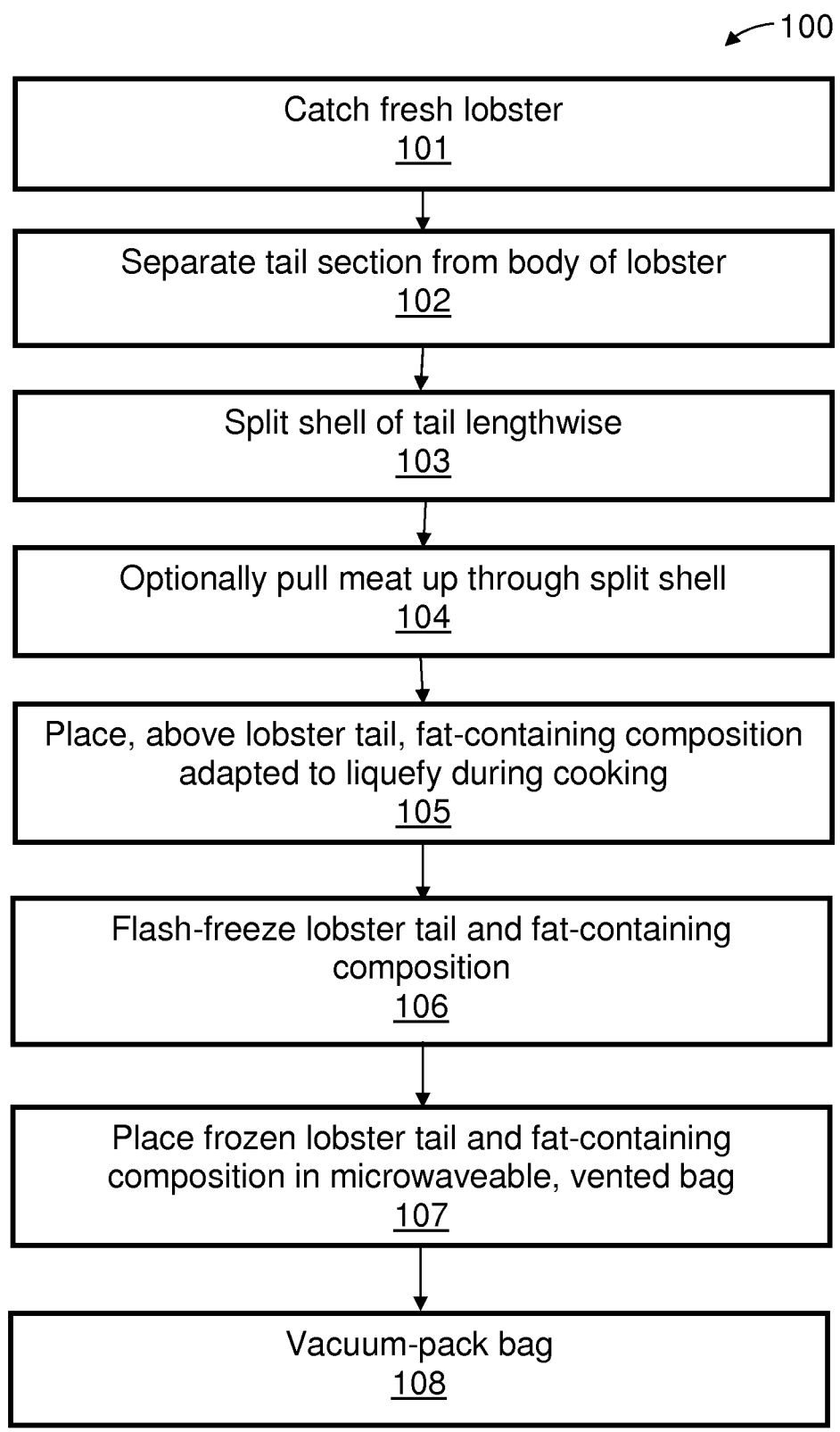
FIG. 1 shows a flowchart of an exemplary method for manufacturing a microwaveable frozen lobster tail product consistent with a first exemplary embodiment of the invention.

Microwaving thawed lobster normally results in uneven cooking and tough, rubbery lobster meat. Instead, embodiments of the invention use fresh-frozen lobster designed to be cooked in the microwave while still frozen, to avoid this problem. The lobster is cooked from frozen inside microwaveable packaging, along with a fat-containing composition. In some embodiments, various herbs, spices, seasonings, and flavorings are included in the fat-containing composition to form a sauce that combines the juices of the lobster with these other elements. The sauce is created while the lobster tail cooks inside the packaging. The flavors can be customized, and since the lobster is cooked together with the fat, the combination of lobster juice and sauce forms an integrated lobster-and-sauce product, with no loss of juices or flavor. The natural juices from the raw lobster are captured and infused into the sauce, and the sauce is created as the lobster cooks, rather than after the lobster cooks.

Embodiments of the invention provide a new type of minimally-processed product for the lobster industry for an entire new market, creating new demand, and increasing revenue for lobstermen and seafood companies, while decreasing transportation and storage costs. Embodiments of the invention eliminate the problem of attempting to provide live lobsters that often die during transport or at some other point before cooking. Additionally, live lobsters held in a tank lose weight over time, and embodiments of the invention avoid this problem by fresh-freezing lobster tails instead of storing live lobsters in a tank.

Conventional processing of lobster for preparation by the home consumer involves the use of considerable amounts of sodium. Although a certain amount of sodium is naturally present in shellfish, the presence of an excess amount of sodium in shellfish normally does not interfere with home cooking, such as when shellfish is boiled, baked, fried, grilled, or the like.

However, when shellfish is cooked in a microwave oven, an abundance of sodium can be problematic. Microwave ovens cook food primarily by reversing the polarity of water molecules in food each millisecond, thereby creating friction that cooks the food as the water molecules essentially act as fuel sources. Although protein, fat, and starch molecules also absorb microwave energy to a lesser degree, salt molecules tend to break apart in the presence of water. When this occurs, sodium and chlorine ions create heat by colliding in the rapidly-oscillating electromagnetic field, leaving less microwave energy available to cook the center of the food. A result of this phenomenon can be seen with a refrigerated bowl of soup placed in a microwave for reheating. The soup near the outside of the bowl encounters the microwave energy first, heats rapidly, and appears to boil. However, the center of the soup is still cold, because the salt ions around the outside of the bowl absorb sufficient energy to produce localized boiling before the rest of the soup can even absorb sufficient energy to begin heating.

When shellfish containing too much sodium is cooked in a microwave, the meat becomes mushy due to the breakdown of the protein structure caused by the abundance of sodium ions. For this reason, shellfish treated with sodium tripolyphosphates (STPPs), shellfish that has been brined, and shellfish that contains too much sodium for any other reason is not suitable for microwave cooking. Accordingly, conventional lobster products, which are mostly brined and treated with STPPs, are unsuitable for use in connection with microwave cooking.

It is therefore desirable that no brining steps be included during the flash-freezing process, nor in any other part of the process of manufacturing a microwaveable frozen lobster tail product consistent with embodiments of the invention. This is because brine is a salt-based solution, and an abundance of salt ions interferes with microwave cooking.

For similar reasons, lobster treated with STPPs or other sodium salts should also desirably not be used in any part of the process of manufacturing a microwaveable frozen lobster tail product consistent with embodiments of the invention.

For similar reasons, any fat-containing composition used in a lobster product consistent with embodiments of the invention should desirably contain little or no salt. For example, if butter is used as a fat-containing composition, then the butter should desirably be unsalted butter, or composed primarily of unsalted butter, i.e., unsalted butter with only a small amount of salt added for taste, e.g., a concentration of 95% unsalted butter or higher.

While normal processing of lobster includes brine and STPPs, minimal processing of lobster according to embodiments of the invention does not include steps of brining or the use of STPPs.

Avoiding the use of brine, STPPs, and/or fat-containing compositions that contain salt ions therefore promotes evenness of cooking when the lobster tail is cooked in the microwave.

Embodiments of the invention provide processes for manufacturing and cooking a lobster tail, as well as lobster-tail products manufactured and cooked according to such processes.

With reference to the flowchart of FIG. 1 and the views of FIGS. 2-7, an exemplary method 100 for manufacturing a minimally-processed microwaveable frozen lobster tail product consistent with a first exemplary embodiment of the invention will now be described.

Figure 2:
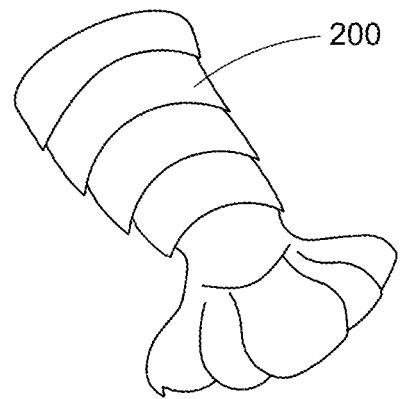
FIG. 2 shows a lobster tail section, in a step of the exemplary method of manufacture of a microwaveable frozen lobster tail product consistent with a first exemplary embodiment of the invention.

First, at step 101, a fresh lobster is caught. As shown in FIG. 2, at step 102, a lobster tail section 200 with the shell intact, weighing approximately 3.75 to 4 ounces (106 to 113 grams), is separated from the body of the lobster.

Figure 3:
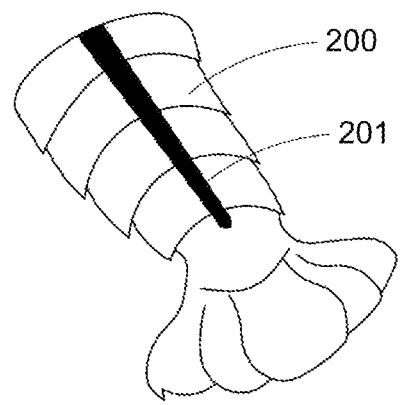
FIG. 3 shows a lobster tail section with a cut made lengthwise in the shell, in a step of the exemplary method of manufacture of a microwaveable frozen lobster tail product consistent with a first exemplary embodiment of the invention.

As shown in FIG. 3, at step 103, a cut 201 is made in at least a portion of the shell of the lobster tail, to split the shell lengthwise. Although FIG. 3 shows that a split is made only along the top surface of the lobster tail, one or more cuts lengthwise may be made along the top and/or bottom surfaces of the tail to split the shell. In alternative embodiments, the shell and its contents may be partially or entirely split in half lengthwise, or otherwise cut into strips or sections, or the shell could be pierced with holes or perforated. Splitting or cutting the shell makes the lobster tail easier to eat and also results in the lobster meat cooking in a sauce that will be created during the cooking process, as will be explained in further detail below, which imparts additional moisture into the meat.

Figure 4:
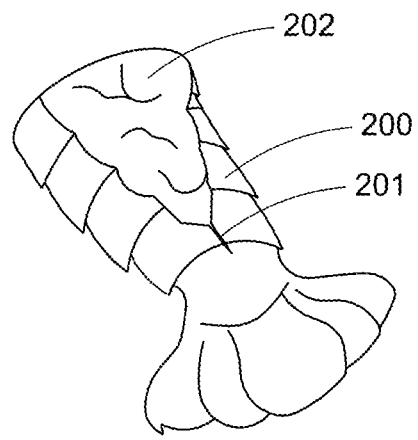
FIG. 4 shows a lobster tail section with the lobster meat pulled up through the cut in the shell to expose a portion of the meat, in a step of the exemplary method of manufacture of a microwaveable frozen lobster tail product consistent with a first exemplary embodiment of the invention.

As shown in FIG. 4, at an optional step 104, after the shell has been split, the lobster meat 202 is pulled up through the cut 201 in the shell of the lobster tail, so that a portion of the meat 202 is exposed outside of the shell.

Figure 5:
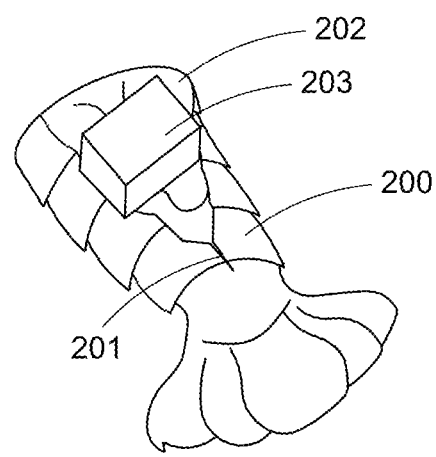
FIG. 5 shows a lobster tail section with a fat-containing composition placed above the lobster tail, in a step of the exemplary method of manufacture of a microwaveable frozen lobster tail product consistent with a first exemplary embodiment of the invention.

As shown in FIG. 5, at step 105, a solid or semi-solid composition 203 containing a fat adapted to liquefy during cooking, such as 1 ounce (28 grams) of butter or compound composed of mostly butter, is placed above the lobster tail. In one embodiment, the fat-containing composition is disposed above or near an exposed portion of lobster meat, so that the liquid will trickle directly onto the meat as it liquefies during cooking. The fat-containing composition may further contain herbs, spices, seasonings, and other flavorings that will be infused into the lobster meat during cooking.

At step 106, the lobster tail and fat-containing composition are flash-frozen. Flash freezing (or "blast freezing") freezes the lobster tail quickly by subjecting it to cryogenic temperatures, e.g., well below the 32° F. (or 0° C.) melting point of water, causing the water inside the lobster tail to freeze in a very short period without forming large crystals, thus avoiding damage to sensitive cell membranes.

Figure 6:
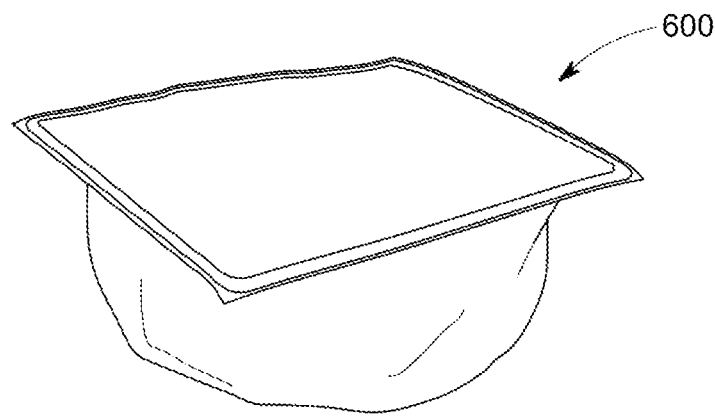
FIG. 6 shows a two-piece microwaveable thermoform pouch adapted to vent during cooking, in a step of the exemplary method of manufacture of a microwaveable frozen lobster tail product consistent with a first exemplary embodiment of the invention.
Figure 7:
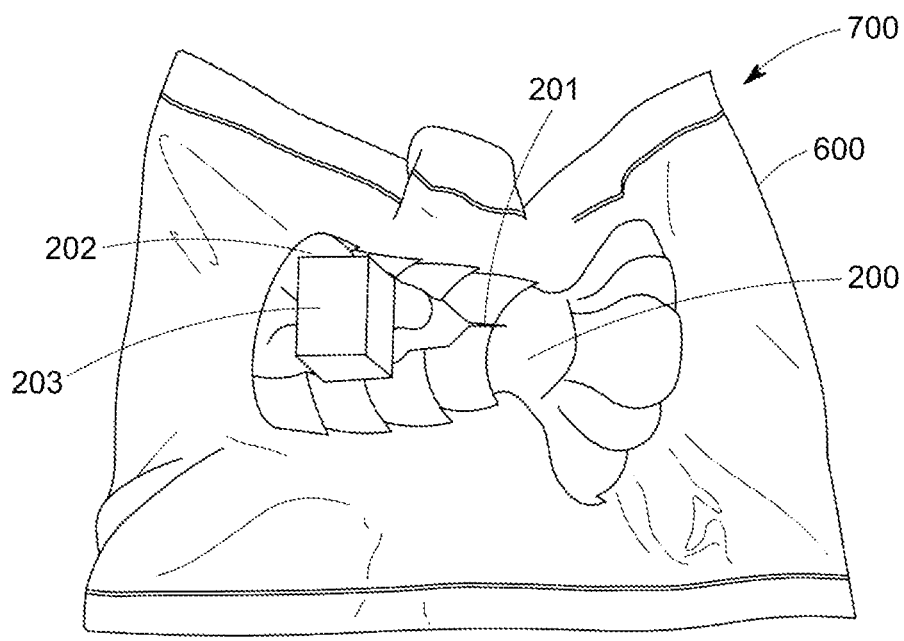
FIG. 7 shows a finished microwaveable frozen lobster tail product consistent with a first exemplary embodiment of the invention.

At step 107, the frozen lobster tail and fat-containing composition are placed in a two-piece microwaveable thermoform pouch, such as the exemplary pouch 600 shown in FIG. 6. Pouch 600 is formed from two layers of resilient material that is strong enough to prevent being pierced by the lobster shell, and it is specifically noted that the lobster tail does not rest on any kind of rigid carrier or pallet within pouch 600. Additionally, the top resilient layer of pouch 600 directly contacts the fat-containing composition, which remains above the lobster tail the lobster tail is cooked. In this manner, both the top and bottom resilient layers of pouch 600 make direct contact with the lobster tail, and there is no risk of interference caused by any additional rigid carrier or pallet layer during the cooking process. An additional cost savings is achieved by not having to use an additional rigid carrier layer or tray to hold the lobster tail within pouch 600. At step 108, the contents of the pouch are vacuum-packed, resulting in product 700 shown in FIG. 7, which is ready for (optional) additional packaging, and then labeling and transport to a retail supply chain.

The home consumer purchases a unit at retail that contains product 700 and brings it home. To cook the lobster tail, the consumer pierces product 700 with the tip of a knife (e.g., at the location of the fat-containing composition) for ventilation, then inserts product 700 into a standard microwave oven, shell-side down, and cooks it at a power of 800 watts for approximately 2 minutes and 30 seconds, at an internal temperature of 184° F. (84.4° C.). At higher wattages, small downward adjustments in cooking times are made. During the cooking process, the frozen lobster tail defrosts and gently poaches in the microwaveable pouch to fully cook, while the fat-containing composition liquefies and forms a sauce that combines with the lobster meat to create a tender and juicy ready-to-eat lobster tail. While many methods of cooking raw lobster tail, such as grilling, result in the cooked lobster tail sticking to the shell, an advantageous and convenient result of microwave-cooking a lobster tail is that the lobster meat separates easily from the shell, in a single piece.

Figure 8:
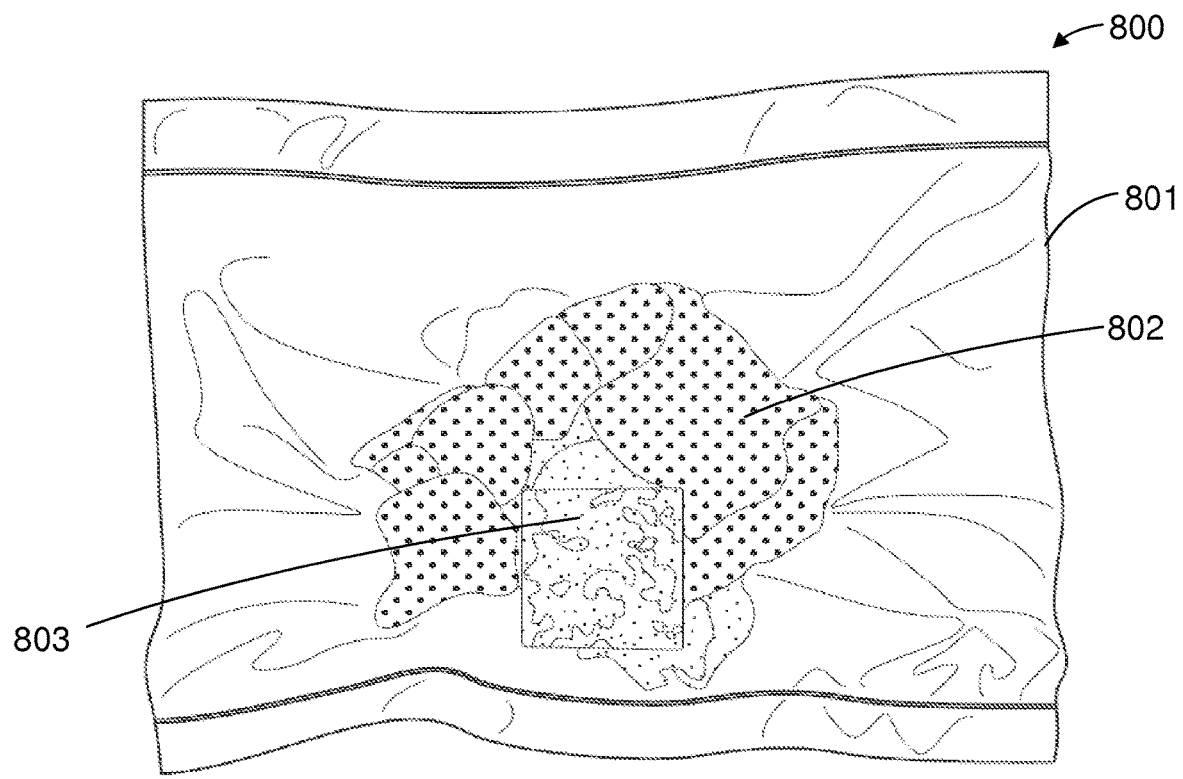
FIG. 8 shows a finished microwaveable frozen lobster tail product consistent with a second exemplary embodiment of the invention.

FIG. 8 shows a microwaveable frozen lobster tail product 800 consistent with a second exemplary embodiment of the invention. As shown, product 800 is similar to product 700, except that product 800 employs a lobster tail 802 weighing approximately 2.25 to 3 ounces (64 to 85 grams) with its shell fully removed. A fat-containing composition 803 is disposed above the shelled lobster tail 802, either before or after flash-freezing, and the lobster tail 802 and fat-containing composition 803 are vacuum-packed into a two-piece microwaveable pouch 801 adapted to vent during cooking. Although FIG. 8 shows a whole lobster tail in a package, a shelled lobster tail may be cut into two or more pieces prior to packaging in some embodiments. To cook the lobster tail, the home consumer inserts product 800 into a standard microwave oven, with the underside of the tail desirably facing up, and cooks it at a power of 800 watts for approximately 1 minute and 30 seconds, at an internal temperature of 184° F. (84.4° C.). At higher wattages, small downward adjustments in cooking times are made.

Figure 9:
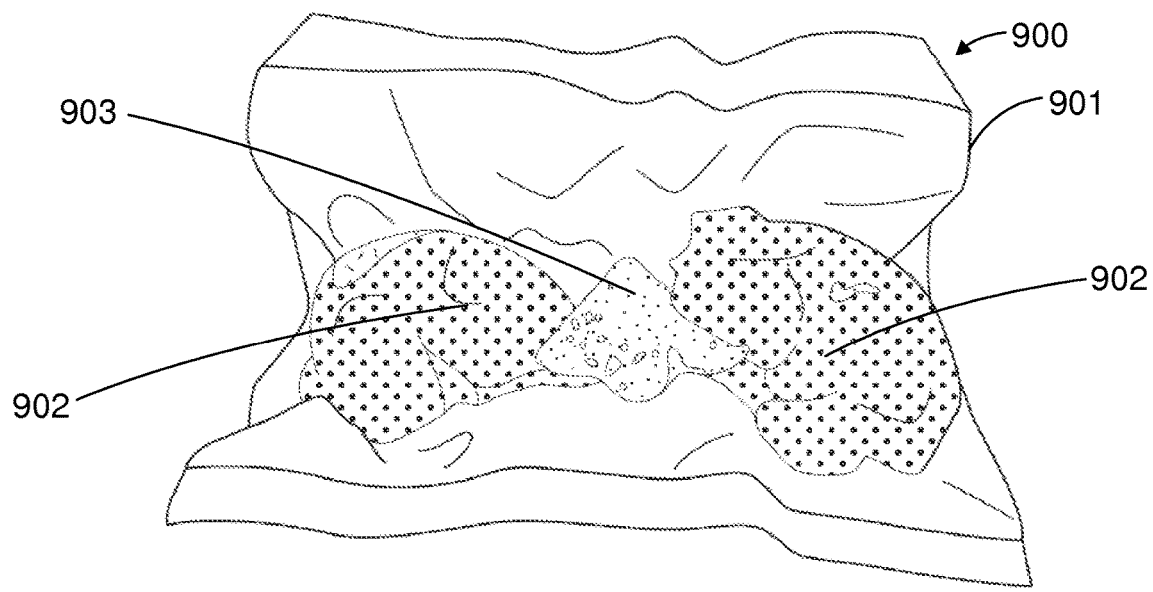
FIG. 9 shows a finished microwaveable frozen lobster tail product consistent with a third exemplary embodiment of the invention.

FIG. 9 shows a microwaveable frozen lobster tail product 900 consistent with a third exemplary embodiment of the invention. As shown, product 900 is similar to product 800, except that product 900 employs two lobster tails 902 with their shells fully removed, packed together in a single two-piece microwaveable pouch 901. A single portion of fat-containing composition 903 is disposed centrally above and located between the two lobster tails 902, either before or after flash-freezing, and the lobster tails 902 and fat-containing composition 903 are vacuum-packed into the pouch 901. This arrangement permits the use of a single portion of fat-containing composition with multiple lobster tails. Although FIG. 9 shows lobster tails 902 with their shells fully removed, this arrangement can also be used with lobster tails that are still in their shells. Although FIG. 9 shows only two lobster tails packaged together, it should be understood that more than two lobster tails could be packaged together, in alternative embodiments of the invention. However, it has been found that a total weight of lobster not exceeding 8 ounces (or 226 grams) in a single microwaveable package is desirable in order to consistently produce a high-quality product when cooked. Accordingly, in one embodiment, four 2-ounce (57 gram) lobster tails are desirably disposed in a single microwaveable package. In another embodiment, two 3-ounce (85 gram) lobster tails are desirably disposed in a single microwaveable package.

It is desirable that a ratio of approximately 1 ounce (28 grams) of fat-containing composition be used either per 3-ounce (85-gram) lobster tail, or for every 3 ounces (85 grams) of lobster meat, and that the amount of fat-containing composition be increased or decreased appropriately to suit the amount of lobster meat used. The fat-containing composition is desirably placed on the flesh side of the lobster tail.

In some embodiments, the fat-containing composition is added after the lobster tail is flash-frozen instead of the fat-containing composition being flash-frozen along with the lobster tail.

In some embodiments, a fat-containing liquid may be used, instead of a fat-containing solid or semi-solid adapted to liquefy during cooking. In this scenario, the lobster may absorb the liquid so as to marinate before being flash-frozen, whereby the infusion of fat into the lobster is similar to the process that takes place while marinating a piece of raw chicken or other meat.

In some embodiments, the packaging is vented and includes one or more seams adapted to vent at a predetermined temperature and/or pressure. Alternatively, the packaging may be fully sealed, and the consumer may be directed to pierce, slit, or otherwise vent the packaging prior to microwave cooking. In other embodiments, non-vented packaging is used, in which case bursting a seam is not likely to affect doneness. However, the user is directed to avoid a mess in this instance by placing the package on a plate or bowl during cooking.

It is desirable that no water glaze be included during the flash-freezing process, nor in any other part of the process of manufacturing a microwaveable frozen lobster tail product consistent with embodiments of the invention. This is because water glaze tends to produce a waterlogged sauce and a lobster with a significant reduction in lobster flavor. Further, water glazing increases the price of lobster meat to the consumer, due to the addition of unnecessary water weight.

Variables that may affect microwave cooking time for the packaged lobster tail meat include, e.g., microwave oven wattage, preparation of the lobster tail (shell on/shelled; whole/cut into pieces; etc.), lobster tail size and weight, contents of the fat-containing composition, type of microwavable packaging and ventilation scheme employed, and the like.

Figure 10:
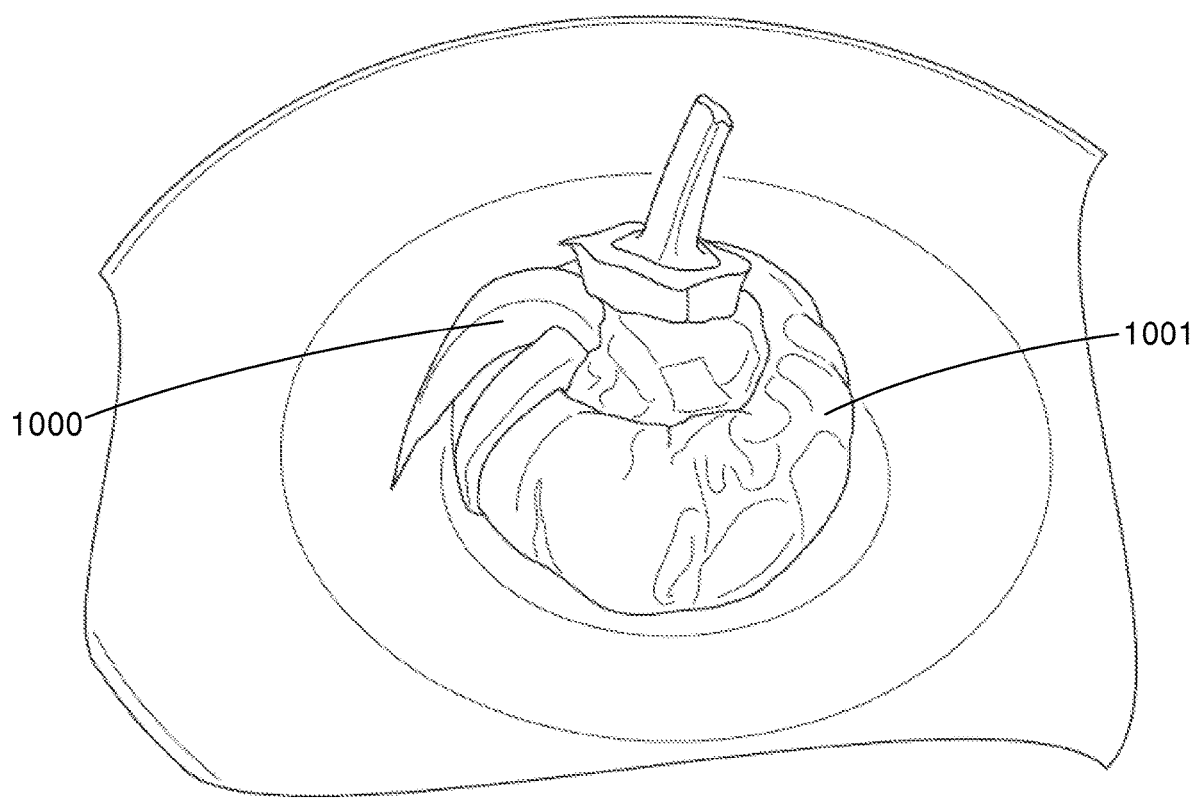
FIG. 10 shows an exemplary application of a microwaveable frozen lobster tail product consistent with a fourth exemplary embodiment of the invention.

The lobster tail product can be adapted by a manufacturer for specific applications. As shown in FIG. 10, in a fourth exemplary embodiment, the lobster tail product is pre-combined with specific flavorings in the thermoform packaging to make a one-step microwaveable filling 1000 for a gourd 1001.

The tails of either soft-shell lobsters or hard-shell lobsters may be used, in different embodiments of the invention. Soft-shell lobster tails are relatively easier to use in conjunction with thermoform packaging, because the incidence and risk of piercing the packaging is reduced relative to hard-shell lobster tails, which have hard edges and may require repackaging after piercing. Additionally, the use of smaller lobster tails (e.g., up to 8 ounces (or 226 grams) for soft shells in summer, and up to 4.5 oz (or 113 grams) for hard shells in winter) is desirable because the shells are softer relative to larger lobster tails. Additionally, soft-shell lobsters are juicier due to a higher water content and tend to produce a more tender final product. It is also desirable that tails of the North American Lobster (*Homarus americanus*) be used in embodiments of the invention.

A product consistent with embodiments of the invention has numerous advantages, including the following. There is a savings in labor, both in terms of eliminating the need to keep lobster alive and properly conditioned, and reducing kitchen preparation time and effort. The cooked lobster tail product has a restaurant-quality consistency and texture and a quality flavor. There is no need to dip the cooked lobster in sauce, because the lobster emerges from the cooking process already combined with the sauce. Lobster out of the shell and split tails in the shell can expand during cooking without the restrictions that would occur if the lobster were completely enclosed by the shell. The lobster meat plumps and is better able to absorb the accompanying fat and additional flavoring when cooking from frozen.

Embodiments of the invention are suitable for the home cook who wants to have perfectly-cooked lobster as part of a meal in a short amount of time, without the mess, investment in additional ingredients and tools, time and money associated with conventional lobster cooking, and further providing the benefit of marrying a sauce with the lobster, using the lobster's original juices. The product can be used by end consumers with little knowledge of how to properly cook lobster.

In alternative embodiments, previously-frozen lobster tails could be used instead of fresh-frozen or flash-frozen lobster tails, depending on the methods used to process those tails and the degree of quality intended for the end product. Price may be an issue for the end consumer, and a previously-frozen tail may end up being less expensive to use than a tail processed from fresh.

It is also noted that lobsters lose weight when out of water. Over a 24-hour period, a 3-4% loss of weight can be observed, which results in less sauce after cooking using methods such as those exemplary methods described herein.

It should further be noted that adding a fat-containing composition to a raw lobster tail before freezing is likely to produce a more flavor-infused tail meat, while adding such butter to an already-frozen tail is likely to reduce the infusion of flavor into the lobster meat relative to a fresh tail, whose juices will combine with the fat-containing composition to create an extremely flavorful sauce.

It has been observed by the inventor hereof that, for lobster tails with shell on, using an 1100-watt continuous-cook microwave oven, the following cooking times are desirably used, in embodiments of the invention:

| Lobster tail weight | Cook Time |
| --- | --- |
| 3 oz. (85 grams) | 2 minutes 45 seconds |
| 4 oz. (113 grams) | 3 minutes |
| 4 to 4.5 oz. (113 grams to 126 grams) | 3 minutes 15 seconds |
| 5 to 5.35 oz. (142 to 152 grams) | 3 minutes 25 seconds |

It has also been observed by the inventor hereof that, in one embodiment of the invention, a shell-on lobster tail weighing 3.86 ounces (109 grams) with 1.108 ounces (31.4 grams) of butter cooked well in an 1100-watt continuous-cook microwave oven in 2 minutes 45 seconds in a vented package, with a good texture and flavor. In another embodiment of the invention, a shell-on lobster tail weighing 6.07 ounces (172 grams) with 1.108 ounces (38.8 grams) of butter cooked well in an 1100-watt continuous-cook microwave oven in 4 minutes in a vented package, with a good texture and flavor. In another embodiment of the invention, a shell-on lobster tail weighing 6.19 ounces (175 grams) with 1.108 ounces (41.3 grams) of butter cooked well in an 1100-watt continuous-cook microwave oven in 4 minutes in a vented package, with a good texture and flavor.

It should be understood that various changes in the details, materials, and arrangements of the parts which have been described and illustrated in order to explain the nature of this invention may be made by those skilled in the art without departing from the scope of the invention. For example, it should be understood that the inventive concepts of embodiments of the invention may be applied to foods other than lobster.

The term "lengthwise," as used herein, refers to a direction generally parallel to the longitudinal axis of the lobster tail.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Although the invention has been set forth in terms of the exemplary embodiments described herein and illustrated in the attached documents, it is to be understood that such invention is purely illustrative and is not to be interpreted as limiting. Consequently, various alterations, modifications, and/or alternative embodiments and applications may be suggested to those skilled in the art after having read this disclosure. Accordingly, it is intended that the invention be interpreted as encompassing all alterations, modifications, or alternative embodiments and applications as fall within the true spirit and scope of this disclosure.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A microwaveable lobster product comprising:
    a lobster tail having a shell containing lobster meat, the shell having a longitudinal axis with at least one cut formed generally parallel to the longitudinal axis;
        wherein the lobster tail has been substantially separated from a body portion of a lobster;
    a fat-containing composition disposed in a region above the lobster tail; and
    a vacuum-packed microwaveable package comprising first and second resilient layers, the first resilient layer disposed under the lobster tail and contacting the lobster tail, and the second resilient layer disposed above the lobster tail and contacting the lobster tail and the fat-containing composition;
        wherein the vacuum-packed microwavable package is vented and
        wherein the first and second resilient layer are non-rigid.

2. The microwaveable lobster product of claim 1, wherein the fat-containing composition is disposed above an exposed portion of the lobster meat.

3. The microwavable lobster product of claim 1, wherein the at least one cut formed generally parallel to the longitudinal axis of the shell comprises at least one cut formed along the longitudinal axis of the shell and the fat-containing composition is disposed above the at least one cut formed along the longitudinal axis of the shell.

4. The microwaveable lobster product of claim 1, wherein the fat-containing composition is a solid or semi-solid compound.

5. The microwaveable lobster product of claim 1, further comprising a second lobster tail having a shell containing lobster meat, the shell having a longitudinal axis with at least one cut formed along the longitudinal axis, wherein:
    the first resilient layer is disposed under both of the lobster tails and contacts both of the lobster tails,
    the second resilient layer is disposed above both of the lobster tails and contacts both of the lobster tails and the fat-containing composition, and the fat-containing composition is disposed in a region above both of the lobster tails.

6. The microwaveable lobster product of claim 1, wherein the lobster tail is unglazed.

7. The microwaveable lobster product of claim 1, wherein the lobster tail is unbrined.

8. The microwaveable lobster product of claim 1, wherein the fat-containing composition is composed primarily of unsalted butter.

9. The microwaveable lobster product of claim 1, wherein the lobster tail is frozen in a substantially uncooked state.

10. A method for manufacturing a microwaveable lobster product, the method comprising:
    (a) substantially separating a lobster tail from a body portion of a lobster;
    (b) forming at least one cut generally parallel to the longitudinal axis of the shell of the lobster tail containing lobster meat;
    (c) disposing a fat-containing composition in a region above the lobster tail; and
    (d) disposing the lobster tail and the fat-containing composition together in a vacuum-packed microwaveable package comprising first and second resilient layers, such that the first resilient layer is disposed under the lobster tail and contacts the lobster tail, and the second resilient layer is disposed above the lobster tail and contacts the lobster tail and the fat-containing composition; wherein the vacuum-packed microwavable package is vented; and wherein the first and second resilient layer are non-rigid.

11. The method of claim 10, wherein step (c) comprises disposing the fat-containing composition above an exposed portion of the lobster meat.

12. The method of claim 10, wherein the at least one cut formed generally parallel to the longitudinal axis of the shell comprises at least one cut formed along the longitudinal axis of the shell and wherein step (c) comprises disposing the fat-containing composition above the at least one cut formed along the longitudinal axis of the shell.

13. The method of claim 10, wherein the fat-containing composition is a solid or semi-solid compound.

14. The method of claim 10, further comprising:
    (e) disposing, in the vacuum-packed microwaveable package, a second lobster tail having a shell containing lobster meat, the shell having a longitudinal axis with at least one cut formed along the longitudinal axis, wherein:
        the first resilient layer is disposed under both of the lobster tails and contacts both of the lobster tails,
        the second resilient layer is disposed above both of the lobster tails and contacts both of the lobster tails and the fat-containing composition, and
        the fat-containing composition is disposed in a region above both of the lobster tails.

15. The method of claim 10, wherein the lobster tail is unglazed.

16. The method of claim 10, wherein the lobster tail is unbrined.

17. The method of claim 11, wherein the fat-containing composition is composed primarily of unsalted butter.

18. The method of claim 10, wherein the lobster tail is frozen in a substantially uncooked state.

* * * * *